(12) United States Patent
Ichinose et al.

(10) Patent No.: US 7,692,325 B2
(45) Date of Patent: Apr. 6, 2010

(54) WIND POWER GENERATION SYSTEM

(75) Inventors: Masaya Ichinose, Hitachiota (JP);
Motoo Futami, Hitachiota (JP);
Hiromitsu Sakai, Tokai (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/366,668

(22) Filed: Feb. 6, 2009

(65) Prior Publication Data

US 2009/0200803 A1    Aug. 13, 2009

(30) Foreign Application Priority Data

Feb. 8, 2008    (JP) ............................. 2008-028301

(51) Int. Cl.
*H20P 9/04*    (2006.01)

(52) U.S. Cl. .............................. 290/44; 290/43; 290/54; 290/55; 322/24; 322/28; 322/44

(58) Field of Classification Search .................. 290/43, 290/44, 54, 55; 322/24, 28, 44; 415/4.2; 416/1

See application file for complete search history.

(56) References Cited

U.S. PATENT DOCUMENTS

| | | | | |
|---|---|---|---|---|
| 5,168,208 | A * | 12/1992 | Schultz et al. | 322/25 |
| 7,372,174 | B2 * | 5/2008 | Jones et al. | 290/44 |
| 7,417,333 | B2 * | 8/2008 | Miller et al. | 290/44 |
| 7,518,256 | B2 * | 4/2009 | Juanarena Saragueta et al. | 290/44 |

OTHER PUBLICATIONS

Eizo Kita, et al., 400-MW Adjustable-Speed Pumped-Storage Hydraulic Power Plant, Hitachi Review (1995), pp. 55-62, vol. 44, No. 1, Hitachi Works, Hitachi, Ltd.

* cited by examiner

*Primary Examiner*—T C Patel
*Assistant Examiner*—Iraj A Mohandesi
(74) *Attorney, Agent, or Firm*—Antonelli, Terry, Stout & Kraus, LLP.

(57) ABSTRACT

In a wind power generation system, an AC input of a unit for coping with system faults is connected to an excitation converter and a DC port of the unit for coping with system faults is connected to a DC port of a converter through resistors. A plurality of energy consumptive circuits each constructed of a resistor and switching units are provided for the DC port of the unit for coping with system faults.

11 Claims, 10 Drawing Sheets

WIND POWER GENERATION SYSTEM

BACKGROUND OF THE INVENTION

The present invention relates to a wind power generation system which can realize, when a voltage drop such as a power failure occurs in an electric power system, protection of a converter connected to the rotor AC excitation type generator by absorbing an overcurrent generated in the rotor.

In the AC excitation type generator used in a generating set, the frequency of a voltage generated in the stator as the rotor undergoes excitation can be made to be equal to a system frequency by AC exciting the rotor winding at a slip frequency (the difference between the system frequency and the rotating frequency) by means of a power converter. Making the excitation frequency of rotor (slip frequency) variable brings about such advantages that the number of rotations of a wind turbine can be allowed to be variable and the capacity of the power converter can be smaller than that of the generator.

In the event that a voltage drop due to, for example, a ground fault takes place in the electric power system, however, the AC excitation type generator is so operated as to supply a current to the fault point. At that time, an overcurrent is induced in the rotor winding, causing an excessive current to flow in a converter for excitation connected to the rotor and therefore, a countermeasure has been taken which installs a unit called a crow-bar for short-circuiting the rotor circuit by using thyristors.

Recently, standards for such a regulation that during a system fault, the wind power generation system should continue operation without being disconnected from the power system have been established in Europe and accordingly, it has been demanded that during a voltage drop for a short period, the wind power generation system should not be disconnected from the power system and running for power generation should be resumed after recovery from the fault, thus minimizing the influence the fault has upon an electric power system.

In the past, the AC excitation type generator has principally been used for a large scale generation system such as installed in a pumping-up power station and in the event of a large scale of power failure in the system, a running method of short-circuiting the rotor circuit by means of a separately-excited device has been adopted.

SUMMARY OF THE INVENTION

An object of the present invention is to provide a wind power generation system which can protect a power converter for excitation AC excitation type generator from an overcurrent caused by a system accident or a system disturbance to enable the generator to operate without disconnecting it from the power system.

To accomplish the above object, in a wind power generation system according to the present invention, an AC input of a unit for coping with system faults is connected to a converter for excitation, a DC port of the unit for coping with system faults is connected to a DC port of the converter through resistors, and overcurrent consumptive means comprised of a resistor and switching means is provided for the DC port of the unit for coping with system faults.

The wind power generation system according to the invention further comprises means for connecting the DC port of the overcurrent consumptive means to a DC port of the excitation and system side converters through the medium of impedance.

Further, in the wind power generation system of the present invention, resistors are used as the impedance for connecting the DC port of the overcurrent consumptive means to the DC port of the excitation and system side converters.

In the wind power generation system of the invention, resistance R of the resistor is so set as to meet a time constant CR of 100 ms or more, where a capacitor provided for the converter DC port has a capacitance of C.

In the wind power generation system of the invention, the plurality of resistors are connected at higher potential of the DC port of the rectifier means and the switching means are connected at lower potential of the DC port.

In the wind power generation system of the invention, the overcurrent consumptive means is located more distantly from the earth than the converter in order to reduce its earth electrostatic capacity.

In the wind power generation system of the invention, an AC terminal of the rectifier means of overcurrent consumptive means is directly connected to an AC terminal of the converter for AC excitation.

The wind power generation system of the invention further comprises a controller having its power supply backed up and provided for the overcurrent consumptive means in addition to the controller provided for the converter.

The wind power generation system of the invention further comprises means for discharging the electric charge at the DC port by turning on the switching devices of the overcurrent consumptive means when the system side converter and AC excitation converter stop operating.

The wind power generation system of the invention further comprises means for operating the overcurrent consumptive means in response to an excessive AC current of the excitation converter.

The wind power generation system of the invention further comprises means for operating the controller for the overcurrent consumptive means in response to an excessive stator current of the generator.

According to the wind power generation system of the present invention, the power converter for excitation of the AC excitation type generator can be protected from an overcurrent caused by a system fault or system disturbance to permit the generator to operate without disconnecting it from the power system.

Other objects, features and advantages of the invention will become apparent from the following description of the embodiments of the invention taken in conjunction with the accompanying drawings.

DESCRIPTION OF THE EMBODIMENTS

Embodiments of the present invention will now be described with reference to the accompanying drawings.

Embodiment 1

Figure 1:
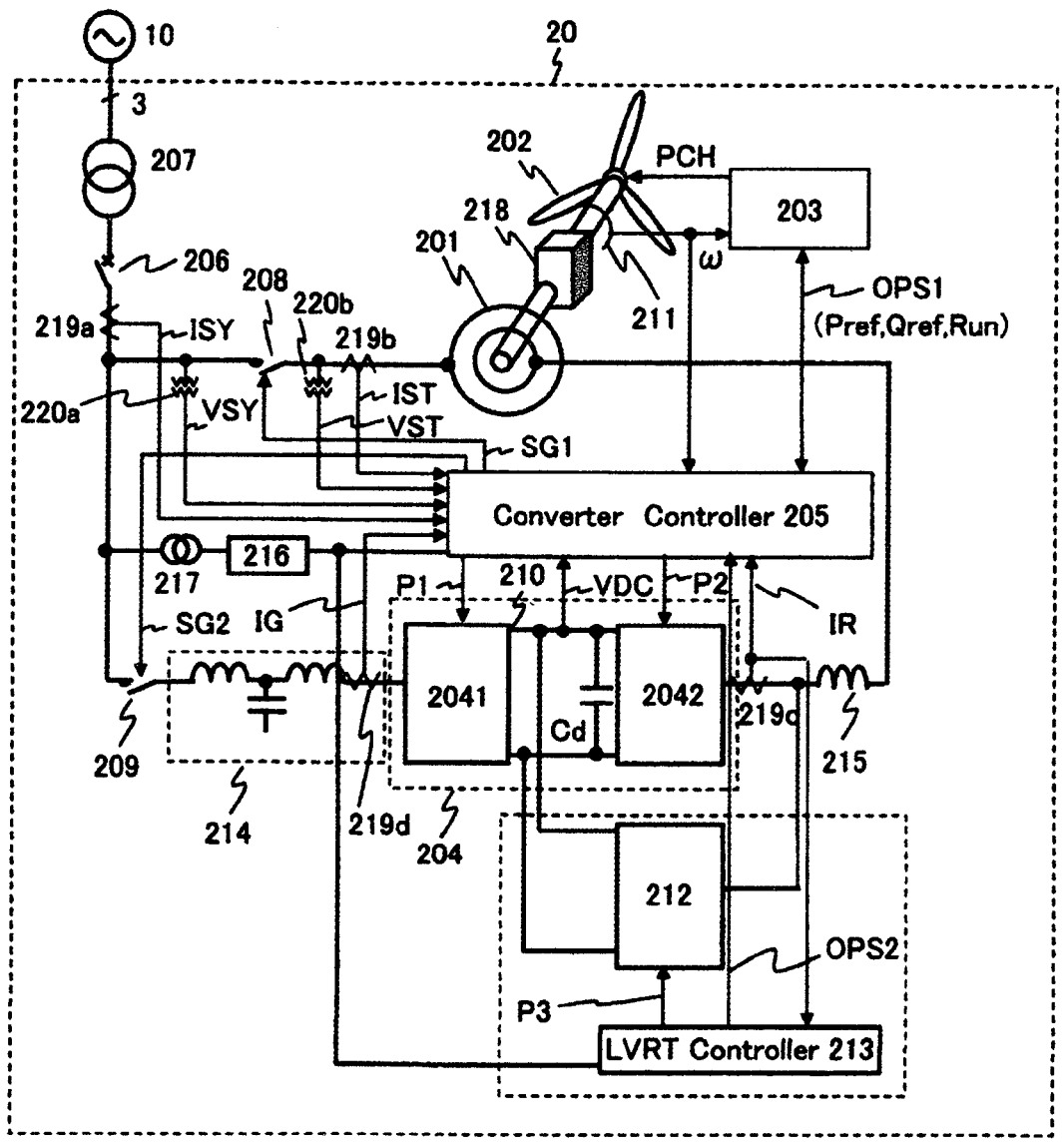
FIG. 1 is a circuit diagram showing the circuit construction of a wind power generation system according to the present invention.

Referring first to FIG. 1, the construction of a system as illustrated in skeleton diagram according to an embodiment of the invention will be described.

A wind power generation system 20 is connected to a commercial electric power system 10 through a transmission line. Principally, the wind power generation system 20 comprises a generator 201, propellers 202, a windmill controller 203, a converter (exciter) 204, a controller 205, a unit for coping with system faults 212 and a controller 213.

The propellers 202 are mechanically connected to a rotor of the generator 201 through a gear 218. The rotor winding of the generator 201 is electrically connected to the converter 204 and a stator of the generator 201 is electrically connected to the electric power system via a circuit breaker 206 and a transformer 207.

The windmill controller 203 calculates a running command signal OPS1 for wind velocity detection, control of the propellers 202, preparation effective power command Pref for generation, delivery of a command Run necessary for start/stop and preparation ineffective power command Qref.

Various components of running signal OPS1 prepared by the windmill controller 203 including the ineffective power command value Qref, effective power command value Pref, start/stop command Run and propeller angle command value are transmitted to the controller 205 and a propeller angle change unit (PCH).

The controller 205 adjusts voltage delivered out of the converter 204 to cause the output voltage to comply with a command value, thus controlling power (generation power, ineffective power) prevailing between the generator 201 and the power system.

Next, the converter (exciter) 204, controller 205, power unit for coping with system faults 212 and a controller 213 will be explained briefly. A three-phase output from the stator of generator 201 is connected to the electric power system 10 via a breaker 208, for example, which can be opened/closed by an external signal SG1, the breaker 206 and the transformer 207. A circuit in common with the breakers 206 and 208 is connected to a filter circuit 214 and then to a converter 2041 through another breaker 209.

A DC circuit or port 210 of the converter 2041 is connected in common with a DC circuit or port of a converter 2042 and an AC output of the converter 2042 is connected to the rotor winding of generator 201 through a reactor 215 adapted for suppression of dv/dt.

A point through which the reactor 215 connects to the converter 2042 is connected with an AC input terminal of the converter 2042 having its DC output terminal connected to the DC port 210 of the converters 2041 and 2042.

The power of the controller 205 is backed up by means of a power supply unit 216 free of power failure and in the event that the system voltage decreases, electric power is supplied from the power fail-safe power supply unit 216 to the controller 205. The power of controller 213 for the unit for coping with system faults 212 is also backed up by the power fail-safe power supply unit 216 and in the event that the system voltage decreases, electric power is supplied from the power fail-safe power supply unit 216 to the controller 213.

The breaker 206 is adapted to protect the wind power generation system 20 and is opened to interrupt current when, for example, an overcurrent continues to flow or is used to stop the wind power generation system 20 completely so as to electrically disconnect the system from the electric power system 10.

Each of the generator side converter 2042 and power system side converter 2041 is constructed by using, for example, semiconductor switching devices (such as thyristors, GTO's IGBT's, MOS's or SiC's) and functions to convert AC to DC or vice versa.

Connected to the AC output terminal of system side converter 2041 is the filter circuit 214 comprised of reactors and a capacitor and adapted to attenuate high-harmonic current and high-harmonic voltage.

The rotary portion of the generator 201 is connected with the propellers 202 for wind power generation through the medium of the gear 218 and it rotates by receiving wind force. Also connected to the rotary portion is a position detector 211 such as for example encoder for detection of rotary position, so that a signal ωindicative of the number of rotations can be outputted. The detected rotation number signal ω is inputted to the windmill control unit 203 and the controller 205.

Next, a description will be given of the wiring and units used for controlling generation power. Values of three-phase voltage and three-phase current on the secondary side of the breaker 206 are converted to a voltage detection signal VSY at low voltage and a current detection signal ISY at low voltage by means of a voltage sensor 220a and a current sensor 219a, respectively, and the voltage detection signal VSY and current detection signal ISY at low voltage are inputted to the controller 205.

Voltage at a secondary terminal of breaker 208 (developing between the breaker 208 and the stator of generator 201) is converted in its value to a voltage detection signal VST by means of a voltage sensor 220b and is also inputted to the controller 205.

Voltage developing across a capacitor Cd connected to the DC port 210 of the converters 2041 and 2042 is converted, by means of a voltage sensor not shown, into a DC voltage signal VDC at low voltage which in turn is delivered to the controller 205.

Further, an output current signal IR of converter 2042 is detected by a current sensor 219c whereas an output current signal IG of converter 2041 is detected by a current sensor 219d and these output current signals IR and IG are also sent to the controller 205.

The windmill controller 203 sends to the controller 205 various command values such as start/stop command Run, effective power command value Prepropellerd ineffective power command value Qrepropellerd besides has the communication function of detecting status variables of the windmill and system and communicating with external units.

The controller 205 controls the circuit breakers 208 and 209 with signals SG1 and SG2, respectively, and besides it outputs pulse signals P1 and P2 for controlling drive of the converters 2041 and 2042, respectively, which are constituted by semiconductor switching devices.

The power source of controller 205 is connected to the power fail-safe power supply unit 216 so that the controller 205 may operate even in the event that system voltage drops. The power fail-safe power supply unit 216 receives a voltage regulated by a transformer 217. When the input voltage to the power fail-safe power supply unit 216 is normal, electric power is fed from the system voltage to the controller 205 but when the system voltage becomes abnormal, electric power is supplied from an energy cumulative element (for example, battery) inside the power fail-safe power supply unit 216 to the controller 205.

Figure 2:
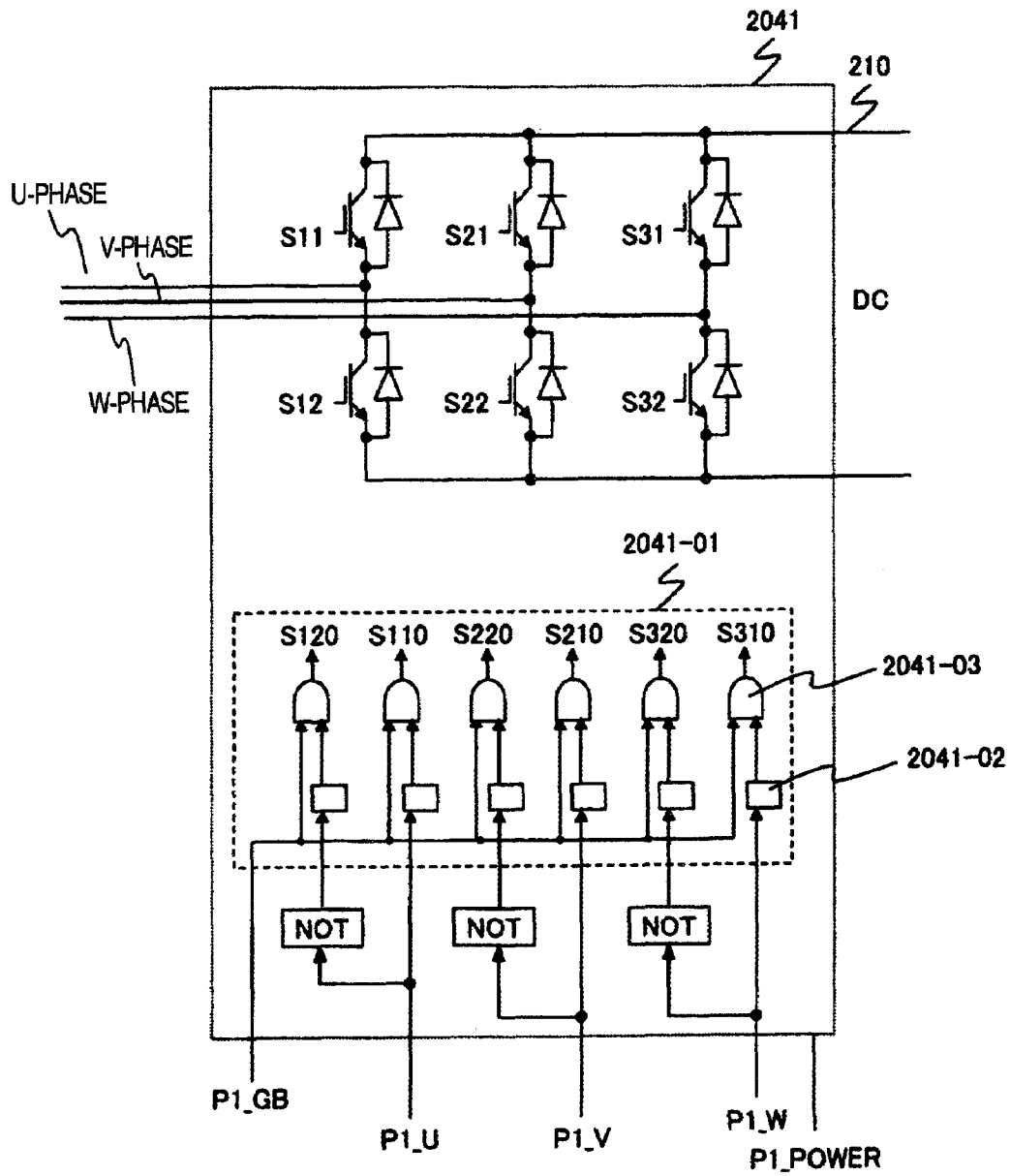
FIG. 2 is a circuit diagram useful to explain the construction of a system side converter 2041.

Turning now to FIG. 2, the construction of the converter 2041 will be described. The converter 2041 is constituted with semiconductor devices, for instance. Here, the converter is constructed as a three-phase converter having semiconductor devices (IGBT's and diodes) S11, S12, S21, S22, S31 and S32. The devices S11 and S12 form U-phase upper and lower arms, the devices S21 and S22 form V-phase upper and lower arms and the devices S31 and S32 form W-phase upper and lower arms.

By turning on and of propeller IGBT (Insulated Gate Bipolar Transistor) of each of these semiconductor devices, a three-phase AC voltage can be generated at the AC terminal and by adjusting the AC voltage, the output current signal IG to be delivered can be controlled.

The gate signal P1 (P1_GB, P1_U, P1_V and P1_W) for turning on/off the semiconductor devices is fed from the controller 205. The gate signal P1 is suffixed with U, V and W to indicate a U-phase gate signal P1_U, a V-phase gate signal P1_V and a W-phase gate signal P1_W, respectively.

The gate signal for the U-phase lower arm device S12 is provided by inverting the gate signal for the U-phase upper arm device S11 to enable the device S12 to be turned off with the device S11 turned on and similarly, for the V-phase upper and lower arms and W-phase upper and lower arms, inversion signals of signals for the upper arms are supplied to the lower arms. For creation of the inversion signal, an inverter NOT is used. In order to provide a time interval for prevention of short-circuiting between the upper and lower arms, a period called dead time is added to each of the gate signals S110 through S320 by means of a short-circuit preventive circuit 2041-02 inside a gate circuit 2041-01.

Also, for the sake of stopping on and off of the semiconductor device, the gate block signal P1_GB is used. The gate block signal P1_GB is inputted to AND circuits 2041_03 along with the pulse signal P1 so that when stopping the gate, P1_GB="0" may stand to turn off all of the semiconductor devices S11 to S32 irrespective of the state of the pulse signal P1.

A gate circuit power supply P1_POWER for turning on and off devices of the converter 2041 is given from the controller 205.

Figure 3:
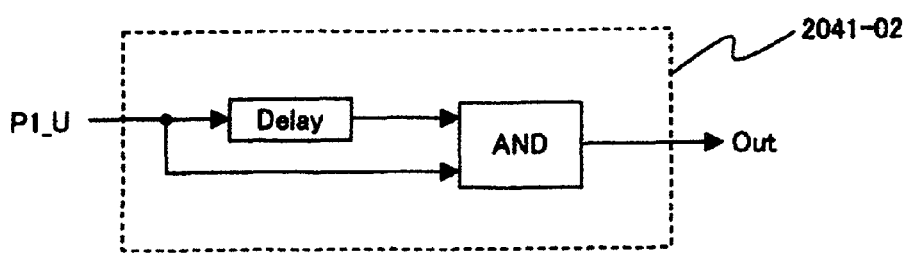
FIG. 3 is a block diagram for explaining dead time adding units 2041-02 and 2042-02.

Illustrated in FIG. 3 is the construction of the short-circuit preventive circuit 2041-02. An inputted pulse is added with a time delay corresponding to the short-circuit preventive period by means of a time delay adder Delay. A signal added with the time delay and the inputted original signal are inputted to an "AND" circuit so as to undergo a logical product operation. Thus, in an output signal Out, the original signal is added with an on-delay corresponding to a time delay Td. By adding the on-delay to each of the upper and lower arm signals in this manner, as the upper switching device turns off, for example, the lower switching device can be turned on after the time delay Td from the turn-off, thereby ensuring that the upper and lower switching devices can be prevented from being turned on transiently simultaneously and DC short-circuiting can be prevented.

Figure 4:
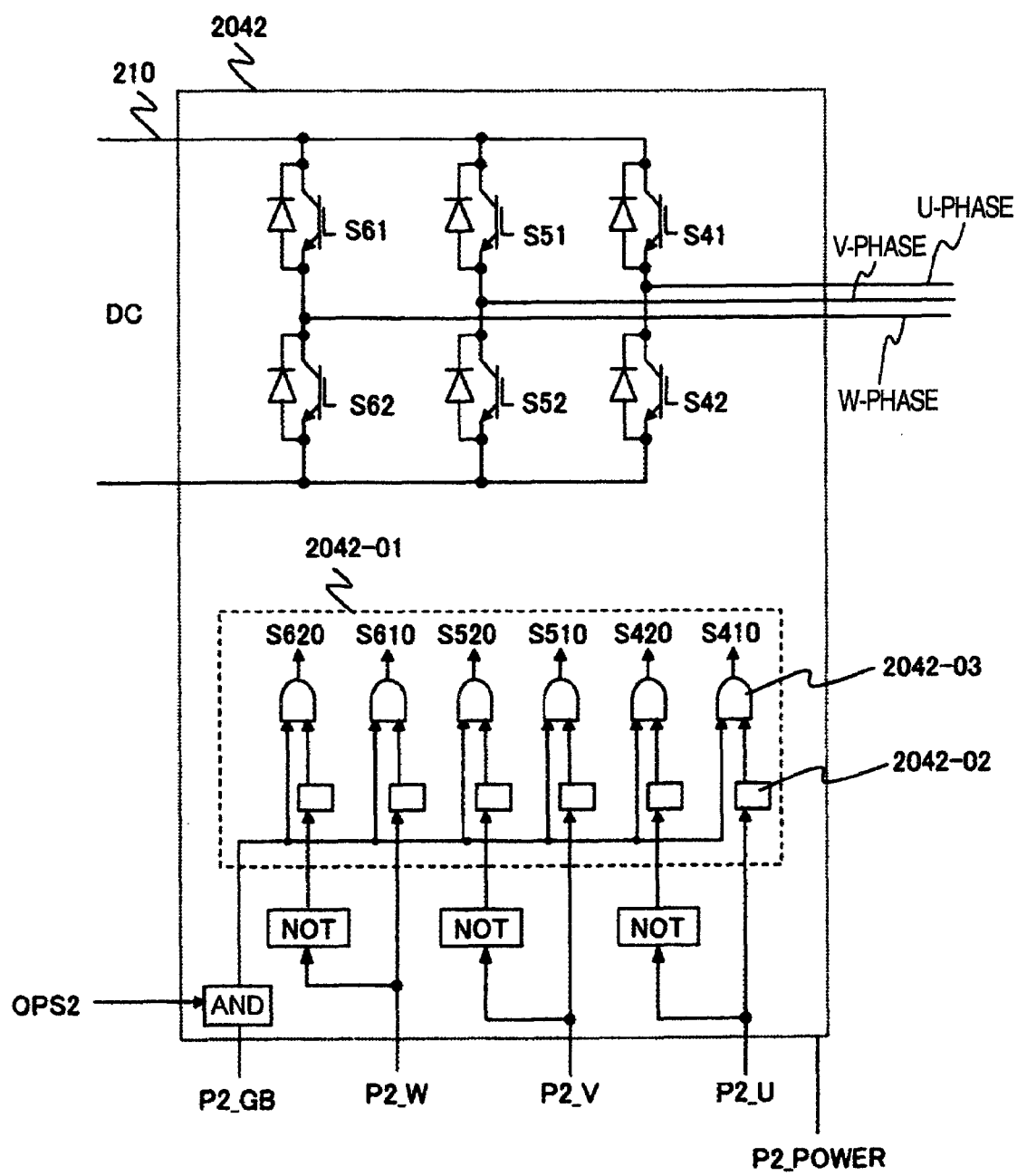
FIG. 4 is a circuit diagram useful to explain the construction of a generator side converter 2042.

Next, reference will be made to FIG. 4 illustrating the construction of the converter 2042. The converter 2042 is constituted with semiconductor devices or the like. Here, the converter is constructed as a three-phase converter having semiconductor devices (IGBT's and diodes) S41, S42, S51, S52, S61 and S62. The devices S41 and S42 form U-phase upper and lower arms, the devices S51 and S52 form V-phase upper and lower arms and the devices S61 and S62 form W-phase upper and lower arms.

By turning on and off each of these semiconductor devices, a three-phase AC voltage can be generated at an AC terminal and by adjusting the AC voltage, the output current signal IR to be delivered can be controlled.

The gate signal P2 for turning on/off the semiconductor devices is fed from the controller 205. The gate signal P2 is suffixed with U, V and W to indicate a U-phase gate signal P2_U, a V-phase gate signal P2_V and a W-phase gate signal P2_W, respectively.

The gate signal for the U-phase lower arm device S42 is provided by inverting the gate signal for the U-phase upper arm device S41 to enable the device S42 to be turned off with the device S41 turned on and similarly, for the V-phase upper and lower arms and W-phase upper and lower arms, inversion signals of signals for the upper arms are supplied to the lower arms. For creation of the inversion signal, an inverter NOT is used. In order to provide a time interval for prevention of short-circuiting between the upper and lower arms, a period called dead time is added to each of the gate signals S410 through S620 by means of a short-circuit preventive circuit 2042-02 inside a gate circuit 2042-01.

For the sake of stopping on and off of the semiconductor device, the gate block signal P2_GB is used. The gate block signal P2_GB is ANDed with a state signal OPS2 from the controller 213 for the unit for coping with system faults and thereafter inputted to an AND circuit 2042-03 provided in association with each pulse signal P2 (P2_U, P2_V or P2_W), so that when stopping the gate, P2_GB="0" may stand to turn off all of the semiconductor devices S41 to S62 irrespective of the state of the pulse signal P2.

A gate circuit power supply P2_POWER for turning on and off devices of the converter 2042 is given from the controller 205.

Figure 5:
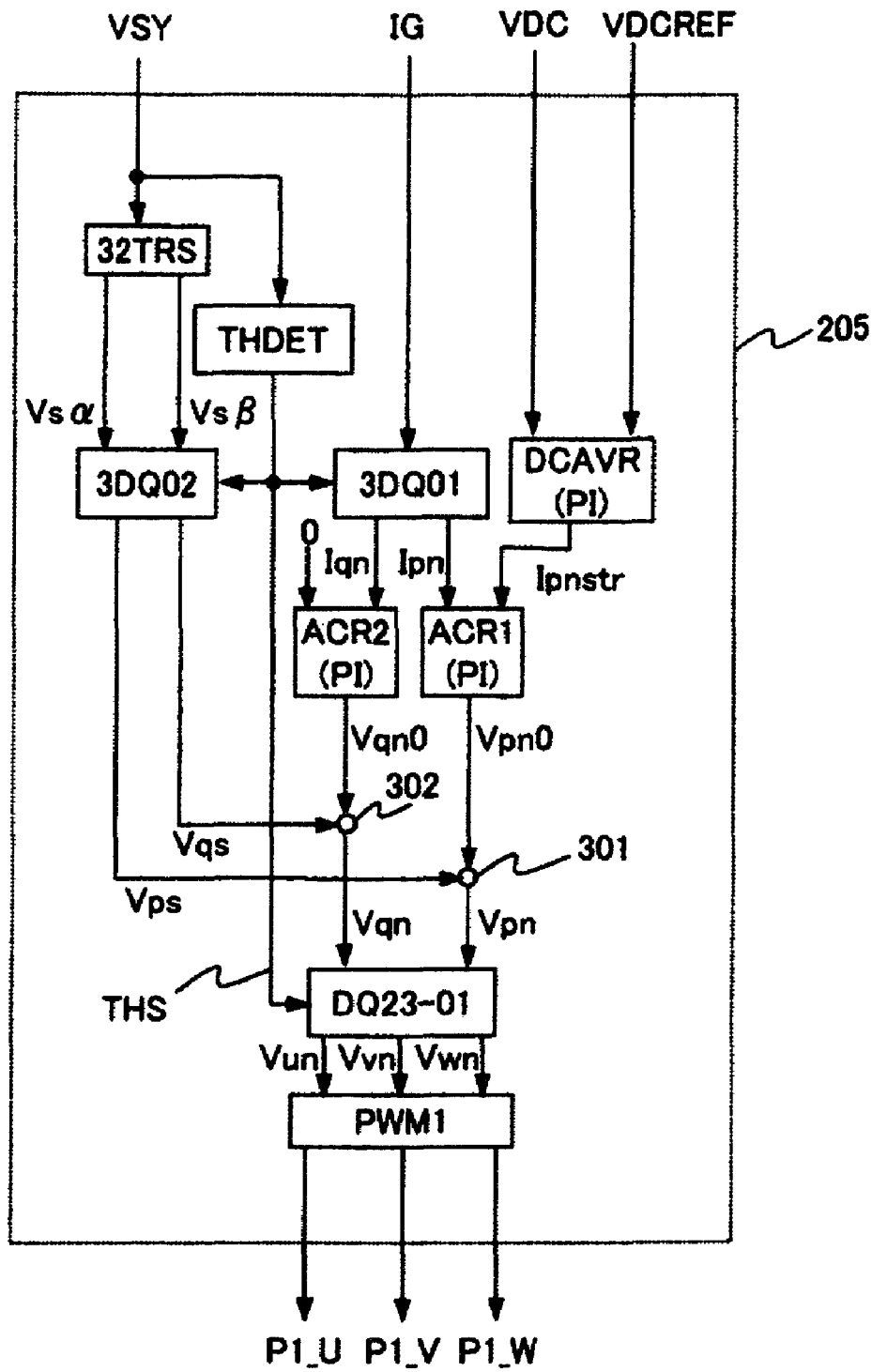
FIG. 5 is a block diagram showing the construction for controlling converter 2041.

Next, by making reference to FIGS. 5 to 8, the function of the controller 205 will be described. Illustrated in FIG. 5 is the construction for controlling the converter 2041. The controller 205 controls the DC voltage VDC at the smoothing capacitor Cd such that it becomes constant. To this end, the controller 205 detects the phase of voltage signal VSY, controls current by using the detected voltage phase and interchanges effective power with the system, thus controlling the DC voltage.

When the generator excitation converter 2042 uses the DC power to consume energy in the smoothing capacitor Cd and so the DC voltage signal VDC decreases, a DC voltage regulator DCAVR of the system side controller 205 operates to adjust an effective current Ipn (effective power component) so that the smoothing capacitor Cd may be charged to keep the DC voltage signal VDC constant but conversely, when the power converter 2042 charges DC power to raise the DC voltage signal VDC, the DC voltage regulator DCAVR operates to convert the DC power into AC power and adjust the effective current Ipn (effective power component) which in turn is discharged to the power system, thereby keeping the DC voltage signal VDC constant.

Before the converter 2041 starts running, a circuit for initial charge of DC voltage (not shown) charges the DC voltage signal VDC and thereafter, the throw-in command SG2 for the breaker 209 is outputted and the converter 2041 is connected to the system.

The AC voltage detection signal VSY is inputted to a phase detector THDET and a three-phase/two-phase converter 32TRS. The phase detector THDET calculates a phase signal THS following a voltage of the system through, for example, a phase locked loop (PLL) and delivers the phase signal THS (a phase signal when the system U-phase voltage is a sine wave) to three-phase/two-phase rotating coordinates converters 3DQ01 and 3DQ02 and a two-phase/three-phase rotating coordinates converter DQ23-01. A DC voltage command value VDCREPropellerd the DC voltage signal VDC are inputted to the DC voltage regulator DCAVR (constructed of for example, a proportional integration controller PI). The DC voltage regulator DCAVR adjusts its output p-axis current command value (effective current command value) Ipnstr such that the difference between the inputted command value VDCREPropellerd DC voltage signal VDC becomes zero, the output p-axis current command value being delivered to a current regulator ACR1.

The three-phase DQ coordinates converter 3DQ01 calculates from the received output current signal IG a p-axis current detection value Ipn (effective current) and a q-axis current detection value Iqn (ineffective current) by using three-phase/two-phase conversion equation (1) and rotating coordinates conversion equation (2), delivering the p-axis current detection value Ipn to the current regulator ACR1 and the q-axis current detection value Iqn to a current regulator ACR2.

Individual phases of the three-phase alternating current are expressed by using suffixes u, v and w, exemplifying a U-phase current of output current signal IG which is designated by IGU. In the following, voltage and so on are similarly designated (U-phase of voltage detection signal VSY being designated by VSYU).

$$\begin{pmatrix} In\alpha \\ In\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} IGU \\ IGV \\ IGW \end{pmatrix} \quad \Lambda \text{ (1)}$$

$$\begin{pmatrix} Ipn \\ Iqn \end{pmatrix} = \begin{pmatrix} \sin(THS) & -\cos(THS) \\ \cos(THS) & \sin(THS) \end{pmatrix} \begin{pmatrix} In\alpha \\ In\beta \end{pmatrix} \quad \Lambda \text{ (2)}$$

The current regulator ACR1 adjusts its output p-axis voltage commend value Vpn0 such that the difference between the p-axis current command value Ipnstr and the p-axis current detection value Ipn becomes zero and delivers the resulting output to an adder 301. Similarly, the current regulator ACR2 adjusts its output q-axis current command value Vqn0 such that the difference between the q-axis current command value (=0) and the q-axis current detection value Iqn becomes zero, delivering the resulting output to an adder 302. Each of the current regulators (ACR1 and ACR2) can be constructed of a proportional integration (PI) controller.

The three-phase/two-phase converter 32TRS calculates from the received voltage detection signal VSY an α component Vsα and a β component Vsβ pursuant to conversion equation (3) and the three-phase/two-phase rotating coordinates converter 3DQ02 receiving the α and β components calculates pursuant to conversion equation (4) a p-axis voltage detection value (a component in phase with a system voltage vector) Vps and a q-axis voltage detection value (a component orthogonal to the p-axis voltage detection value Vps) Vqs which in turn are delivered to the adders 301 and 302, respectively.

$$\begin{pmatrix} Vs\alpha \\ Vs\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Vsu \\ Vsv \\ Vsw \end{pmatrix} \quad \Lambda \text{ (3)}$$

$$\begin{pmatrix} Vps \\ Vqs \end{pmatrix} = \begin{pmatrix} \sin(THS) & -\cos(THS) \\ \cos(THS) & \sin(THS) \end{pmatrix} \begin{pmatrix} Vs\alpha \\ Vs\beta \end{pmatrix} \quad \Lambda \text{ (4)}$$

The adder 301 adds the p-axis voltage command value Vpn0 and the p-axis voltage detection value Vps and delivers its output Vpn to the two-phase/three/phase coordinates converter DQ23-01. Similarly, the adder 302 adds the q-axis voltage command value Vqn0 and the q-axis voltage detection value Vqs, delivering its output Vqn to the two-phase/three-phase coordinates converter DQ23-01.

The two-phase/three/phase coordinates converter DQ23-01 receiving the phase signal THS and the results Vpn and Vqn of the individual adders calculates pursuant to conversion equations (5) and (6) voltage command values Vun, Vvn and Vwn and outputs these values to a pulse operation unit PWM1.

$$\begin{pmatrix} Va \\ Vb \end{pmatrix} = \begin{pmatrix} \sin(THS) & \cos(THS) \\ -\cos(THS) & \sin(THS) \end{pmatrix} \begin{pmatrix} Vpn \\ Vqn \end{pmatrix} \quad \Lambda \text{ (5)}$$

$$\begin{pmatrix} Vun \\ Vvn \\ Vwn \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad \Lambda \text{ (6)}$$

Responsive to the received voltage commands Vun, Vvn and Vwn, the pulse operation unit PWM1 calculates through pulse width modulation the gate signal P1 for turning on/off n semiconductor devices constituting the power converter 2041 and delivers it thereto.

Figure 6:
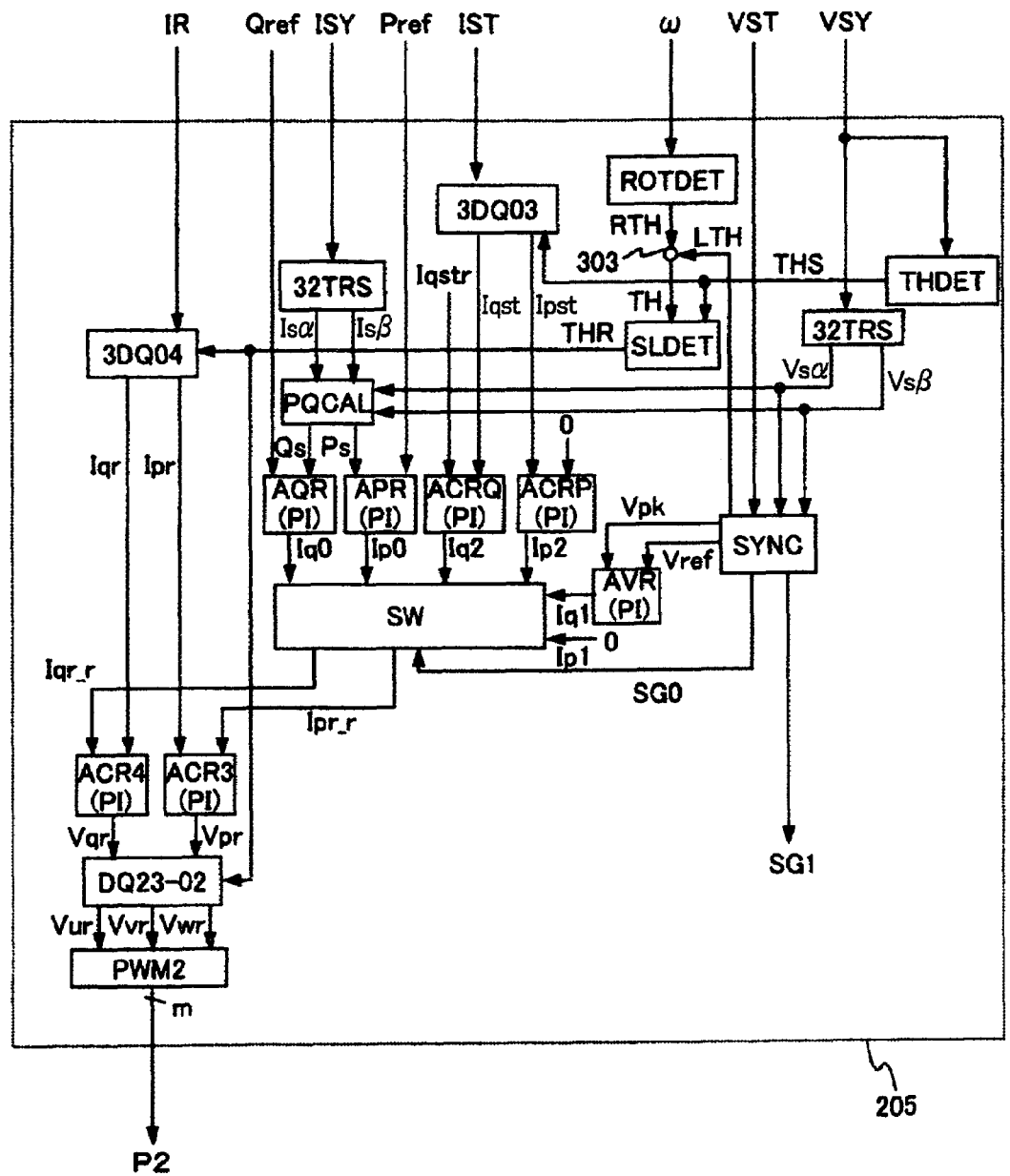
FIG. 6 is a block diagram showing the construction for controlling converter 2042.

Referring now to FIG. 6, how to control the converter 2042 with the help of the controller 205 will be described.

A rotation number signal X indicative of the number of rotations and rotating position of the generator 201 is inputted to a rotating phase detector ROTDET. The rotating phase detector ROTDET counts pulses of rotation number signal ω to convert them into a phase signal and resets the phase signal to zero by using a pulse generated once a rotation (for example, in the case encoder based on ABZ scheme, a Z-phase pulse) to produce a phase signal RTH of 0° to 360° which in turn is delivered to an adder 303.

The phase signal RTH and an output phase signal LTH of a synchronous controller SYNC are added together at the adder 303, producing a phase signal TH which in turn is inputted together with the phase signal THS (which has been explained in connection with control of the converter 2041) to an excitation phase operation unit SLDET.

The excitation phase operation unit SLDET executes subtraction between the phase signals TH and THS and besides performs a gear ratio conversion by k times the number of paired poles of the generator, thus outputting a phase signal THR or (THR=THS−K·TH) in terms of electrical angle frequency of the rotor of generator.

A power operation unit PQCAL receives α-axis current Isα and β-axis current Isβ which have been obtained by converting the current detection signal ISY through conversion matrix defined by equation (1) and α-axis voltage detection value Vsα and β-axis voltage detection value Vsβ which have been calculated through equation (3) and then calculates effective power Ps and ineffective power Qs of the system pursuant to equation (7).

$$Ps=3(Vs\alpha \times Is\alpha + Vs\beta \times Is\beta)/2$$

$$Qs=3(-Vs\alpha \times Is\beta + Vs\beta \times Is\alpha)/2 \quad (7)$$

An effective power regulator APR receives the effective power Ps and an effective power command value Pref for the wind power generation system and delivers its output opropeller effective current command value Ip0 so that the difference between the effective power command value Prepropellerd the power detection value Ps may become zero. Here, a description is given by way of example of the effective power command but in the case of torque command, conversion to an effective power command can be effected by multiplying the torque command by the number of rotations of the generator and the thus obtained effective power command can be used for controlling. Being different from the torque control, the effective power control has the ability to control the output power to a constant level without being affected by a change in rotation number even when the rotation number changes.

An ineffective power regulator AQR receives the ineffective power Qs and an ineffective power command value Qref for the wind power generation system and delivers an excitation current command value Iq0 so that the difference between the ineffective power command value Qref and the power detection value Qs may become zero. Here, each of the power regulators APR and AQR can be constructed of, for example, a proportional integrator.

The current command values Ip0 and Iq0 delivered out of the effective and ineffective power regulators, respectively, are inputted to a transfer switch SW.

The generator stator current IST is inputted to the three-phase rotating coordinates converter 3DQ03. The current the three-phase rotating coordinates converter 3DQ03 receives is decomposed into an effective current Ipst and an ineffective current Iqst through conversion equations (1) and (2) and they are inputted to generator current regulators ACRP and ACRQ, respectively.

The generator current regulator ACRP is fed with zero as a stator effective current command value and calculates a rotor current command value Ip2 so that the effective component Ipst of generator stator current may be zeroed and delivers the calculated command value to the transfer switch SW. The generator current regulator ACRQ is fed with a stator ineffective current command value Iqstr and calculates a rotor current command value Iq2 so that the reactive current component Iqst of generator stator current may coincide with the command value and delivers the calculated command value to the transfer switch SW.

Next, a voltage regulator AVR will be described. The voltage regulator AVR receives as a feedback value an amplitude value Vpk of voltage detection signal VST of the generator stator and besides, as a command value, a value Vref obtained by passing an amplitude value of system voltage detection signal VSY through a filter FIL and delivers to the transfer switch SW an excitation current command value Iq1 so that the difference between the amplitude value of voltage detection signal VST of the generator and the command value may become zero. Here, the voltage regulator AVR can be constructed of, for example, a proportional integration controller. The voltage regulator AVR is operated while the breaker 208 being opened in order that an excitation current command value passed from the converter 2042 to the secondary side of the generator 201 can be so adjusted as to make the amplitude value of system voltage coincident with the amplitude value of stator voltage of the generator Gen.

Figure 7:
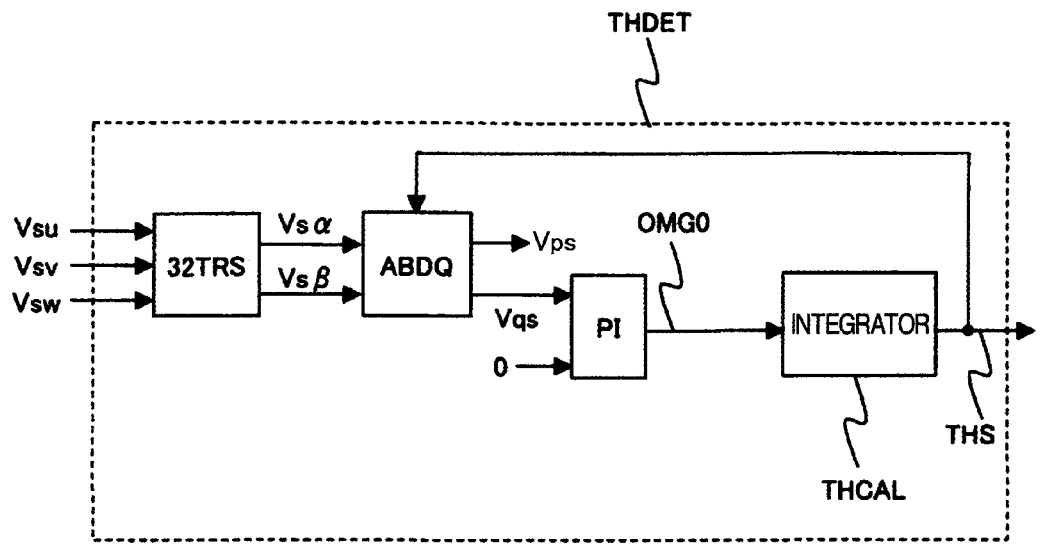
FIG. 7 is a block diagram useful to explain a phase detector THDET.

Turning to FIG. 7, the phase detector THDET will be explained. The phase detector THDET receives the system voltage Vs and the three-phase/two-phase converter 32TRS also receiving the system voltage Vs performs calculation pursuant to equation (3) to convert the voltage Vs into two-phase voltage signals Vsα and Vsβ. A rotating coordinates converter ABDQ receives the two-phase signals Vsα and Vsβ and performs calculation pursuant to conversion equation (4) to provide Vps and Vqs. By utilizing the fact that Vqs is zero if the operated phase THS is in phase with the U-phase of system voltage, the phase is corrected such that the Vqs becomes zero. Accordingly, the Vqs is compared with zero to form a frequency correction command OMG0. The frequency correction value OMG0 is inputted to an integrator THCAL where it is integrated so as to be converted into a phase signal THS.

Figure 8:
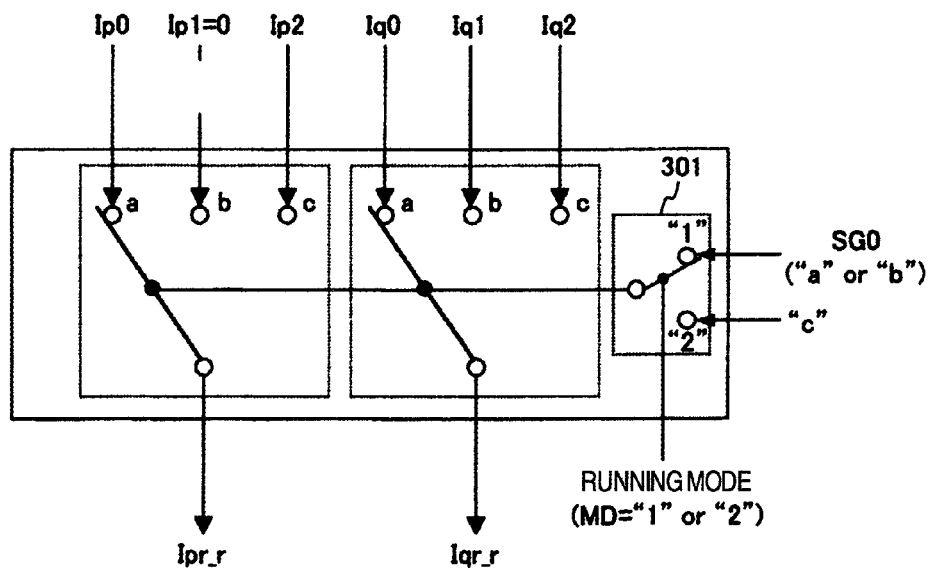
FIG. 8 is a circuit diagram of a command switch SW.

The transfer switch SW is constructed as illustrated in FIG. 8. The switch SW makes a decision as to which one of running modes is to be outputted, the running modes including a normal generation running mode using the outputs of power regulators APR and AQR (Ip0 and Iq0), a system synchronous running mode using zero for the effective current command value and the output Iq1 of voltage regulator for the excitation current command value and besides a running mode attendant on system faults using the outputs of the stator current regulators ACRP and ACRQ (Ip2 and Iq2) adapted to adjust the stator current of the generator.

Before throwing in an electromagnetic contactor 301 (that is, during voltage synchronous running for synchronizing the generator stator voltage with the system voltage, the throw-in signal SG0="b"), the transfer switch SW uses zero for the effective current command value and the output Iq1 of the voltage regulator for the excitation current command value and after the electromagnetic contactor 301 is thrown in (during the throw-in signal SG0="a"), the outputs Ip0 and Iq0 of the individual power regulators APR and AQR are selected. During the normal generation running, the running mode MD signal is "1" and when the command switchover by the throw-in signal SG0 is selected but the running mode changes to MD="2" as a result of detection of a system fault, for instance, the outputs Ip2 and Iq2 of the current regulators ACRP and ACRQ for the stator are selected and outputted from the transfer switch SW.

The synchronous controller SYNC functions to decide, during opening of the breaker 208, from the system voltage detection value Vref and the generator stator voltage detection value Vpk whether the voltage amplitude of the generator is in synchronization, functions to deliver, when the system voltage is dephased from the stator voltage, a phase correction signal LTH for correcting the dephased state and functions to decide whether the phases of the system voltage and stator voltage fall within a predetermined range and they synchronize with each other, and delivers the operation signal SG1 for breaker and the control switchover signal SG0. When the circuit breaker 208 is closed by the signal SG1, the phase correction signal LTH keeps its value at that time.

By virtue of the function of the synchronous controller, synchronization with the system voltage can be done before the generator 201 is connected to the system and besides, after connection to the system is completed, control mode can be switched swiftly to power control.

A three-phase rotating coordinates converter 3DQ04 calculates from a received output current signal IR and the phase THR of the rotor, a q-axis current detection value Iqr (excitation current component) and a p-axis current detection value Ipr (effective current component) pursuant to equations (8) and (9) and outputs the q-axis current detection value Iqr to a current regulator ACR4 and the p-axis current detection value Ipr to a current regulator ACR3.

$$\begin{pmatrix} Ir\alpha \\ Ir\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Iru \\ Irv \\ Irw \end{pmatrix} \quad \Lambda\ (8)$$

$$\begin{pmatrix} Ipr \\ Iqr \end{pmatrix} = \begin{pmatrix} \sin(THR) & -\cos(THR) \\ \cos(THR) & \sin(THR) \end{pmatrix} \begin{pmatrix} Ir\alpha \\ Ir\beta \end{pmatrix} \quad \Lambda\ (9)$$

The current regulator ACR4 adjusts its output q-axis voltage command value Vqr such that the difference between the q-axis current command value Iq1, Iq0 or Iq2 and the q-axis current detection value Iqr becomes zero. Similarly, the current regulator ACR3 adjusts its output p-axis voltage command value Vpr such that the difference between the q-axis current command value Ip1, Ip0 or Ip2 and the p-axis current detection value Ipr becomes zero. Here, the current regulator can be constructed of, for example, a proportional integrator.

The p-axis voltage command value Vpr and the q-axis voltage command value Vqr are inputted to a two-phase/three-phase rotating coordinates converter DQ23-02 which in turn calculates its output voltage command values Vur, Vvr and Vwr from the phase signal THR and the individual input values pursuant to conversion equations (10) and (11) and delivers them to a pulse operation unit PWM2.

$$\begin{pmatrix} Va \\ Vb \end{pmatrix} = \begin{pmatrix} \sin(THr) & \cos(THr) \\ -\cos(THr) & \sin(THr) \end{pmatrix} \begin{pmatrix} Vpr \\ Vqr \end{pmatrix} \quad \Lambda\ (10)$$

$$\begin{pmatrix} Vur \\ Vvr \\ Vwr \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad \Lambda\ (11)$$

Responsive to the received voltage commands Vur, Vvr and Vwr, the pulse operation unit PWM2 calculates the gate signal P2 for turning on/off m semiconductor devices constituting the converter 2042 and delivers the calculation result to thereto.

Referring now to FIGS. 9 to 13, the unit for coping with system faults 212 will be described in greater detail.

Figure 9:
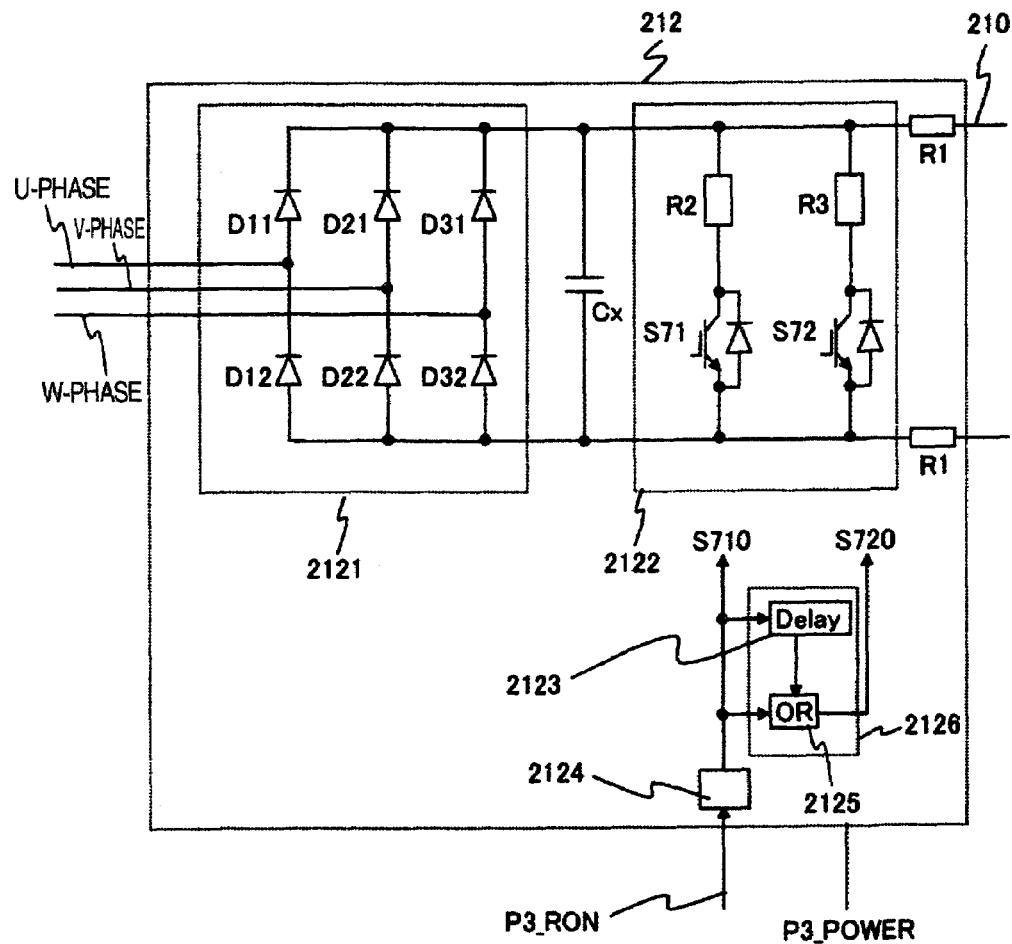
FIG. 9 is a circuit diagram showing the circuit construction of a unit for coping with system faults 212.

The unit for coping with system faults 212 is constructed as illustrated in a circuit diagram of FIG. 9. The unit for coping with system faults 212 includes a rectifier 2121 and an energy consumer 2122. The rectifier 2121 has its AC input connected to the secondary winding terminal of generator 201. The rectifier 2121 is exemplified herein as having diodes D11, D12, D21, D22, D31 and D32.

The rectifier 2121 has its DC port across which a capacitor Cx is connected. Connected to the DC port of the rectifier 2121 is the energy consumer 2122 having a circuit of a semiconductor switch S71 connected with a resistor R2 and another circuit of a semiconductor S72 connected with a resistor R3. The energy consumer 2122 is connected to the DC port of the converter 204 via resistors R1.

When the semiconductor devices S71 and S72 are turned on, an overcurrent generated in the rotor of generator 201 can be absorbed and a current flowing into the converter 2042 can be decreased. At that time, energy of three-phase AC flowing into the DC port of unit for coping with system faults 212 can be consumed in the resistors R2 and R3.

The resistors R2 and R3 are connected at higher potential of the DC port and the switching devices (S71 and S72) are connected at lower potential of the DC port. This connection can ensure that the same power supply referenced to the lower potential can be used for the two switching devices.

The gate signal P3 for turning on/off the semiconductor devices S71 and S72 is supplied from the controller 213 (see FIG. 1). The gate signal P3 (designated at P3_RON in FIG. 9) is first inputted to an on-state holder 2124. The on-state holder 2124 has the function to keep its output signal S710 (for switching device S71) for a predetermined time. With this function, the resistor R2 is turned on (conditioned for energy consumption) for the predetermined time. The signal S710 is also inputted to an off-delay unit 2126. Specifically, in the off-delay unit 2126, the signal S710 is fed to a delayer 2123 for adding a delay time TD2 to the received signal and is also fed to a logical sum operator 2125, so that a signal S720 having its off-timing delayed from that of the input signal S710 by the off-delay time TD2 can be outputted. During on-state of the signal S720, the resistor R3 is turned on or conditioned for energy consumption. As will be seen from the above, in the circuit constructed as illustrated in the figure, the resistors R2 and R3 are turned on simultaneously but turning-off of the resistor R2 precedes, followed by turning-off of the resistor R3.

Figure 10:
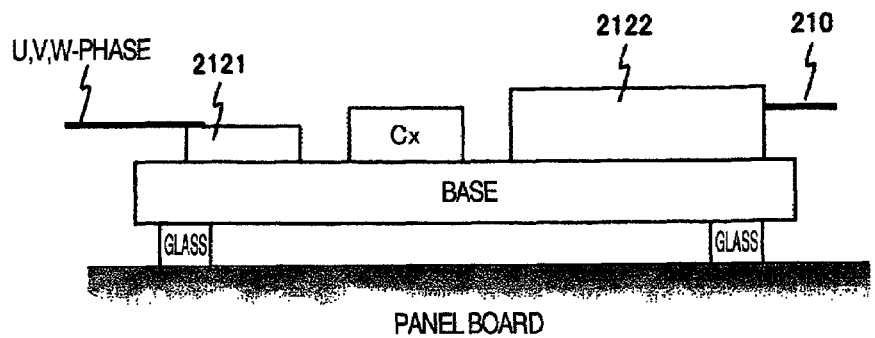
FIG. 10 is a diagram for explaining the structure of the unit for coping with system faults 212.

The unit for coping with system faults 212 is structured as illustrated in FIG. 10. The unit for coping with system faults 212 is installed in a panel board. Then, the rectifier 2121, capacitor Cx and energy consumer 2122 are mounted on a base, having an insulation distance from the panel board (grounded) enough to exhibit a small electrostatic capacitance in relation to the ground. With the electrostatic capacitance decreased, even if the AC terminal of the rectifier 2121 varies in relation to the ground potential, the amount of a zero-phase current flowing into the capacitor Cx through the rectifier 2121 can be reduced (the reduction in electrostatic capacitance means an increase in impedance with respect to the ground).

Figure 11:
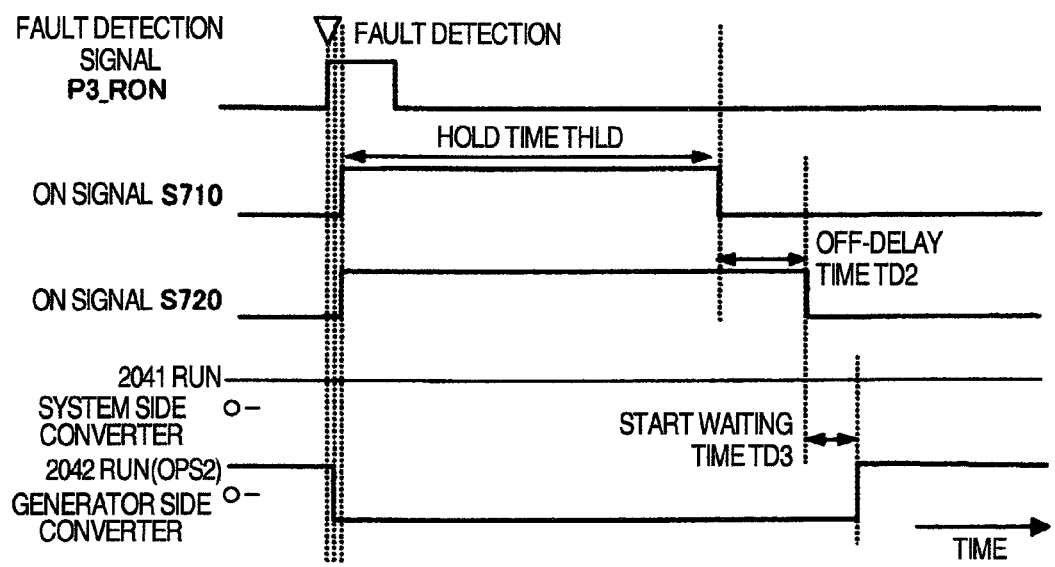
FIG. 11 is a time chart useful in explaining operation of gate signals S710 and S720 of unit for coping with system faults 212.

Operation of the FIG. 9 unit will be described more specifically with reference to FIG. 11. With the FIG. 9 construction, the signals S710 and S720 become on at a time but the signal S710 becomes off precedently and after the delay time TD2, the signal S720 becomes off. Consequently, the resistors R2 and R3 are conditioned for energy consumption concurrently and they remain so conditioned during the hold time THLD. Thereafter, the resistor R2 is turned off and after the delay time TD2, the resistor R3 is turned off.

With a view to maintaining a time for a transient phenomenon in the generator to attenuate, the hold time THLD may preferably be set to about 100 ms.

But, when the resistor is turned on by an instantaneous voltage drop, the system voltage needs to soon recover normality and therefore, in such an event, a shorter on-time of the resistor is preferable for having a less influence upon the power system. For this reason, by using the amplitude of system voltage and the magnitude of anti-phase voltage, the hold time can be managed to be shortened in order for the system voltage to recover normality.

Further, with the situation that the resistor R1 forms a series circuit with the capacitance of capacitor Cd at the DC port of the converter 204 in mind, the resistance of the resistor R1 is preferably set such that the time constant TCR (=R1 [Ω]×Cd [F]) is larger than the hold time THLD and in the case of the hold time THLD being 100 ms as described previously, the time constant TCR may also be 100 ms or more preferably. Through this setting, the amount of DC voltage drop of the converter 204 can be suppressed when the devices S71 and S72 are turned on.

Preferably, the off-delay time TD2 may be larger than the time required for the transient phenomenon to attenuate at the time of turn-off of the device S71.

The unit for coping with system faults 1212 operates as will be described below. When the system is disturbed, for example, when the system voltage drops, an increase ΔI in current is caused by a voltage difference ΔV between the induced voltage and the system voltage. On the assumption that the turn ratio of secondary excitation generator is a, the current in the secondary winding increases by ΔI/a. Then, if the value of current ΔI/a is large, then an overcurrent will flow through the secondary winding.

At that time, the controller 205 detects the overcurrent flowing into the converter 2042 to bring the gate block signal P2_GB into P2_GB=0 and so the converter 2042 stops switching operation of the semiconductor device.

Figure 12:
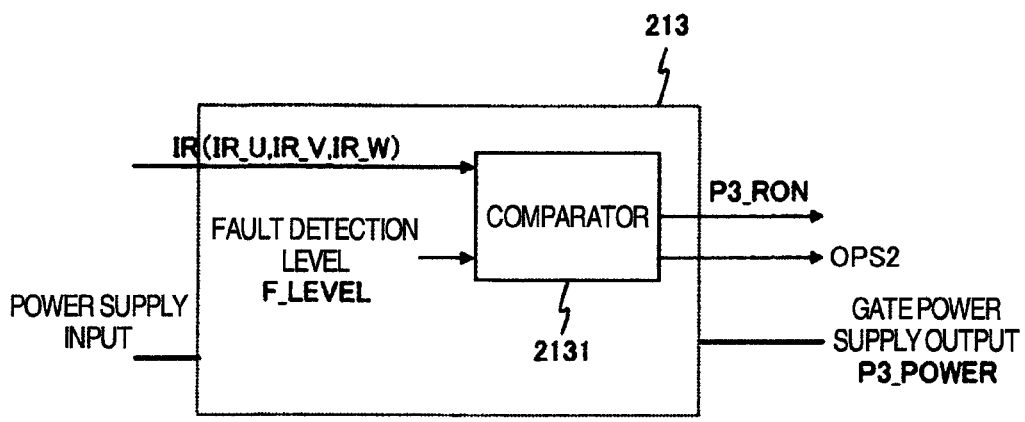
FIG. 12 is a block diagram for explaining the construction for controlling a controller 213 for the unit for coping with system faults.

The controller 213 for unit for coping with system faults constructed as illustrated in FIG. 12 also detects, at a comparator 2131, an overcurrent from the current inputted to the converter 2042 so as to turn on the gate signal P3 (P3=1). At that time, the status signal OPS2 is delivered to the controller 205.

Figure 13:
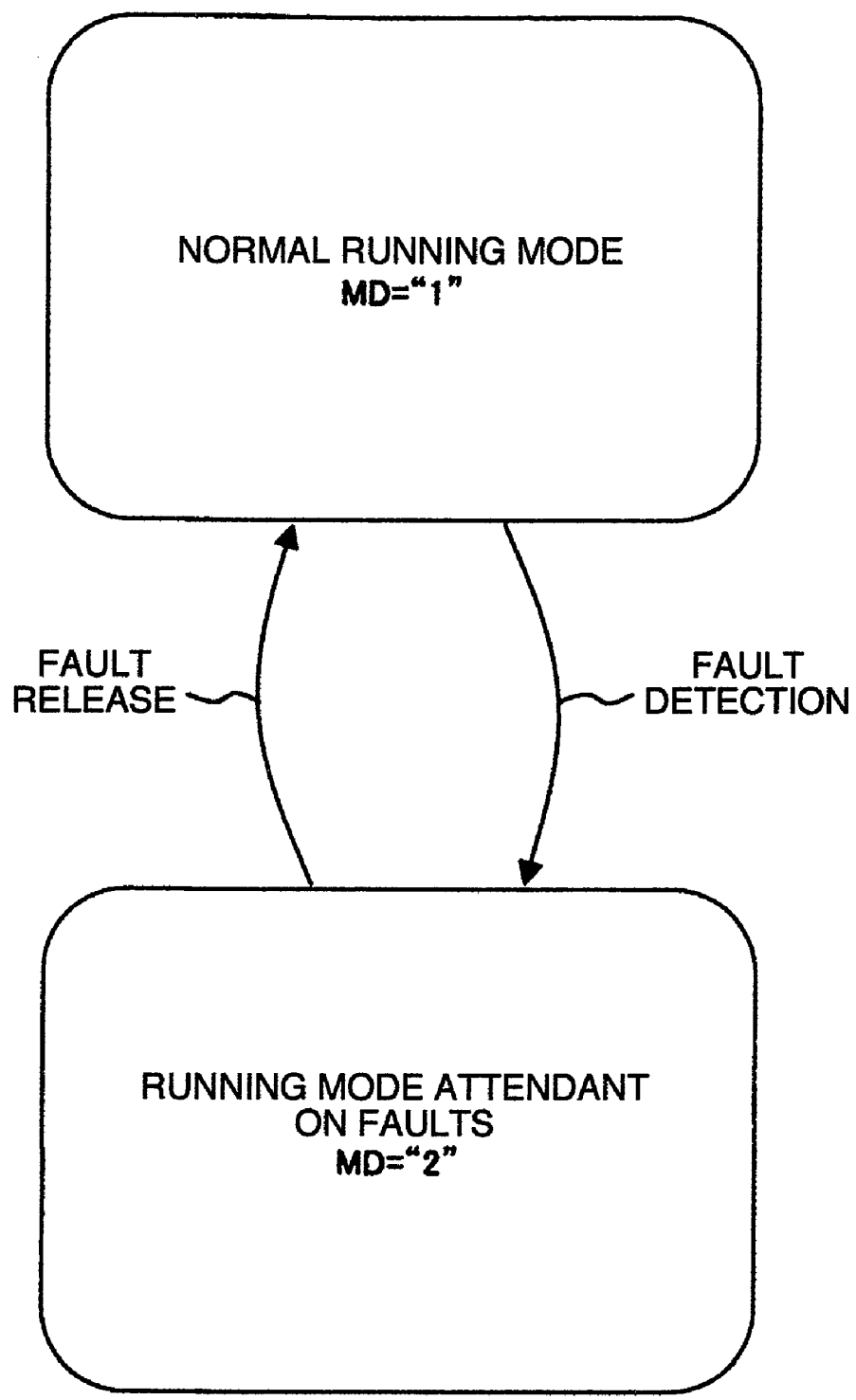
FIG. 13 is a diagram useful to explain the status transit of running mode.

The running mode shown in FIG. 8 will now be described with reference to FIG. 13. FIG. 13 is a transient diagram. As shown in the figure, in the generation running mode, the normal running mode MD is indicated by "1" and the running mode MD when a system fault due to, for example, a voltage drop is detected is indicated by "2".

As the overcurrent or over-voltage/voltage-drop due to a system fault is eliminated and the running is allowed to be ready for starting, running starts in the running mode MD=2 attendant on system faults. With MD=2 set up, control operation switches to controlling the generator stator current as has been described in connection with FIG. 8. The MD=2 condition continues for a time stipulated by the system standards (for example, E. ON GRID "CODE").

As will be seen from the foregoing, the DC port of the unit for coping with system faults 212 is connected to the DC port of the converter 204 via the resistors, so that even when the unit for coping with system faults 212 starts operating, voltage at the DC port of converter 204 remains intact. As the operation of the unit for coping with system faults 212 ends, the DC port of unit for coping with system faults 212 can be charged with an electric charge at the DC port of the converter 204. Consequently, an operation which occurs, upon start of operation of the converter 2042, to charge the DC port of unit for coping with system faults 212 with an AC output of the converter 2042 can be avoided, thus suppressing a rush current caused by charging.

Further, by making the controller 213 for unit for coping with system faults 212 independent of the controller 205, the rotor overcurrent can be absorbed even when the controller 205 is troubled.

By providing a plurality of resistors for energy consumption and disconnecting them stepwise when turning them off, the current flowing into the rotor can be decreased stepwise and the current flowing into the converter 2042 upon turn-off of the resistor can be reduced.

By making the resistor turn-on time (THLD) in the energy consumer changeable with the status of the system voltage (in case the system recovers normality rapidly, the time is shortened), the influence upon the system can be reduced.

The capacitor provided for the DC port of unit for coping with system faults 212 can prevent the switching waveform (voltage of rectangular waveform) of the converter 2042 from being applied to the DC port of unit for coping with system faults 212 to protect it from surge.

When DC voltage of the converter 204 rises until the system is required to be stopped, the resistors in the unit for coping with system faults can be turned on to discharge the DC voltage signal VDC little by little, thereby enabling the system to be restarted rapidly. Upon normal stopping, this contrivance can also be used as a discharger of DC voltage.

Embodiment 2

Figure 14:
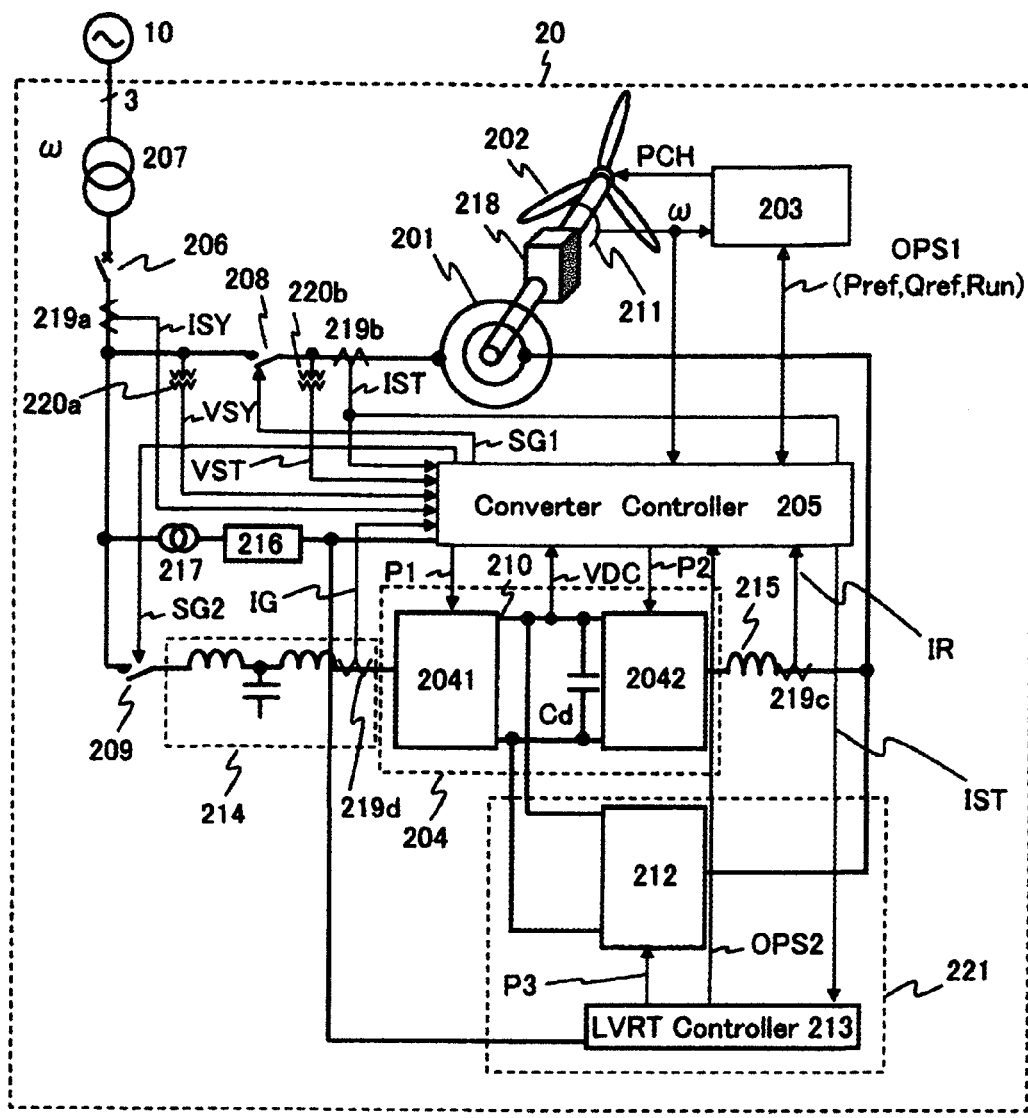
FIG. 14 is a circuit diagram showing the circuit construction of a wind power generation system according to embodiment 2 of the invention.

Turning now to FIG. 14, another embodiment of the present invention will be described. The present embodiment differs from embodiment 1 in that the sensor input is inputted to the controller 213 for the unit for coping with system faults.

In the present embodiment, a generator stator current IST is used to make a decision as to operation of the controller 213 for the unit for coping with system faults. Like the output current signal IR of the converter, an overcurrent also occurs in the stator current in the event of the system fault and therefore, by using this overcurrent, the system fault can be decided. If short-circuiting takes place at the brushes of the rotor winding terminal, the output current signal IR of the converter 2042 increases more rapidly than the stator current and in such an event, the system can be stopped without operating the unit for coping with system faults 212.

The technical idea of the present invention can be applicable also to excitation power converter and generation system of secondary excitation type generator.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wind power generation system comprising:
an AC excitation type generator having its stator connected to an electric power system;
a converter for AC excitation connected to the rotor of said AC excitation type generator, said rotor of said AC excitation type generator being connected to a turbine so as to be rotated by power of said turbine;
overcurrent consumptive means connected between said AC excitation converter and the rotor to consume an overcurrent during a system fault;
a system side converter connected to the stator of said AC excitation type generator and to the electric power system; and
a controller connected to a DC port of said system side converter and a DC port of said AC excitation converter, said controller being backed up when voltage of said system drops so as to control said excitation converter and said system side converter, said AC excitation type generator being operative to feed generated power to said electric power system,
wherein said overcurrent consumptive means includes rectifier means for converting AC to DC;
a plurality of resistors connected to a DC port of said rectifier means;
switching means for turning on/off said resistors; and
a capacitor provided for the DC port of said rectifier means.

2. A wind power generation system according to claim 1 further comprising means for connecting the DC port of said overcurrent consumptive means to the DC port of said excitation and system side converters through the medium of impedance.

3. A wind power generation system according to claim 2, wherein resistors are used as the impedance for connecting the DC port of said overcurrent consumptive means to the DC port of said excitation and system side converters.

4. A wind power generation system according to claim 3, wherein resistance R of said resistor is so set as to meet a time constant CR of 100 ms or more, where a capacitor provided for the converter DC port has a capacitance of C.

5. A wind power generation system according to claim 1, wherein said plurality of resistors are connected at higher potential of the DC port of said rectifier means and said switching means are connected at lower potential of the DC port.

6. A wind power generation system according to claim 1, wherein said overcurrent consumptive means is located more distantly from the earth than said converter in order to reduce its earth electrostatic capacity.

7. A wind power generation system according to claim 1, wherein an AC terminal of said rectifier means of overcurrent consumptive means is connected directly to an AC terminal of said converter for AC excitation.

8. A wind power generation system according to claim 1 further comprising a controller having its power supply backed up and provided for said overcurrent consumptive means in addition to said controller provided for said converter.

9. A wind power generation system according to claim 1 further comprising means for discharging the electric charge at the DC port by turning on said switching devices of said overcurrent consumptive means when said system side converter and said AC excitation converter stop operating.

10. A wind power generation system according to claim 1 further comprising means for operating said overcurrent consumptive means in response to an excessive AC current of said excitation converter.

11. A wind power generation system according to claim 1 further comprising means for operating said controller for said overcurrent consumptive means in response to an excessive stator current of said generator.

* * * * *